(12) United States Patent
Shin

(10) Patent No.: US 10,302,956 B2
(45) Date of Patent: May 28, 2019

(54) STEREOSCOPIC SHEET HAVING VARIABLE PERSPECTIVE VIEWING ANGLE AND THIN-LAYERED STEREOSCOPIC SHEET

(71) Applicants: Hyunjea Shin; DIABELL CO.,LTD.

(72) Inventor: Hyunjea Shin, Paju-si (KR)

(73) Assignee: Hyunjea Shin, Paju-si (KR)

( * ) Notice: Subject to any disclaimer, the term of this patent is extended or adjusted under 35 U.S.C. 154(b) by 292 days.

(21) Appl. No.: 15/113,833

(22) PCT Filed: Jan. 26, 2015

(86) PCT No.: PCT/KR2015/000811
§ 371 (c)(1),
(2) Date: Jul. 24, 2016

(87) PCT Pub. No.: WO2015/111981
PCT Pub. Date: Jul. 30, 2015

(65) Prior Publication Data
US 2017/0003512 A1    Jan. 5, 2017

(30) Foreign Application Priority Data

Jan. 27, 2014 (KR) .................. 10-2014-0009307
Jan. 26, 2015 (KR) .................. 10-2015-0011851

(51) Int. Cl.
*G02B 27/22* (2018.01)

(52) U.S. Cl.
CPC .................. *G02B 27/2214* (2013.01)

(58) Field of Classification Search
CPC .. G02B 27/2214; G02B 27/22; G02B 27/225; G02B 3/005; G02B 27/0093;
(Continued)

(56) References Cited

U.S. PATENT DOCUMENTS

| 7,394,596 | B1 | 7/2008 | Chung | |
|---|---|---|---|---|
| 2008/0174877 | A1* | 7/2008 | Chung | G02B 27/2214 |
| | | | | 359/619 |
| 2011/0058254 | A1 | 3/2011 | Choi | |

FOREIGN PATENT DOCUMENTS

| JP | 2003-035882 A | 2/2003 |
|---|---|---|
| JP | 2013-007940 A | 1/2013 |

(Continued)

*Primary Examiner* — Evan P Dzierzynski
*Assistant Examiner* — Sharrief I Broome
(74) *Attorney, Agent, or Firm* — Im IP Law; C. Andrew Im; Chai Im

(57) ABSTRACT

A stereoscopic sheet having a variable perspective viewing angle and a thin-layered stereoscopic sheet having a three-dimensional decorative effect. The portions of the sheet, viewed three-dimensionally, create dynamic changes according to the perspective distance. The stereoscopic sheet includes convex lenses arrayed on the top surface of the stereoscopic sheet to intersect at regular intervals. A printed layer is formed at the focal distance of the convex lenses. The focal distance of the convex lenses is formed to be approximately 3.5 times longer than the pitch. A repetition gap of a printed pattern formed on a portion of a printed area is determined as a pattern gap to allow the impression of depth or protrusion to be sensed at a short-sighted distance. The repetition gap of the printed pattern is less than a parallax gap at a minimum proximity distance within the short-sighted distance by approximately 80%-98%.

17 Claims, 12 Drawing Sheets

(58) Field of Classification Search
CPC .. G02B 3/0056; G02B 27/26; G02B 27/2264;
G02B 27/2292; G02B 27/4205; G02B
3/0031; G02B 5/18; G02B 5/1866; G02B
6/003; G02B 6/0035; G02B 6/0038
See application file for complete search history.

(56) References Cited

FOREIGN PATENT DOCUMENTS

| | | |
|---|---|---|
| KR | 20-0311905 Y1 | 5/2003 |
| KR | 10-2007-0080608 A | 8/2007 |
| KR | 10-0841438 B1 | 6/2008 |
| KR | 10-2012-0137784 A | 12/2012 |
| KR | 20-0470351 Y1 | 12/2013 |

* cited by examiner

STEREOSCOPIC SHEET HAVING VARIABLE PERSPECTIVE VIEWING ANGLE AND THIN-LAYERED STEREOSCOPIC SHEET

RELATED APPLICATIONS

This application is a § 371 application from PCT/KR2015/000811 filed Jan. 26, 2015, which claims priority from Korean Patent Application Nos. 10-2014-0009307 filed Jan. 27, 2014 and 10-2015-0011851 filed Jan. 26, 2015, each of which is incorporated herein by reference in its entirety.

TECHNICAL FIELD

The present invention relates to one of integral photography technologies by a convex lens, and more particularly, to manufacturing of stereoscopic sheet which can maximize a change in perspective angle of view according to a change of the focal distance, show an active visual image according to refraction of light and a change in vision route using the imaging principle of the eye by a convex lens, and overcome the limitations in recognition within a 'near-sighted' distance and recognition of stereoscopically combined image applied to a small area and the limitation in thickness of a sheet by the focal distance.

BACKGROUND ART

Lens sheets in which convex lenses are arrayed to intersect with one another according to prior arts are common to have basic configuration and principle in that printed patterns arrayed in the same way as the convex lenses are formed at a predetermined focal distance which forms thickness of the sheet and a Moire image is formed three-dimensionally according to the array density of the printed patterns (intervals of the patterns).

Korean Utility Model Registration No. 20-0311905 (granted on Apr. 17, 2003) discloses a 'stereoscopically printed sheet of radial convex lenses'. Korean Utility Model Registration No. 20-0311905 proposes a stereoscopically printing method by a convex lens sheet to make a user see through by differentially dividing clear stereoscopic combined images and images from which unnecessary Moire is removed using a difference in levels of combined images formed at a focal distance and at a defocus distance. However, the stereoscopically printed sheet according to the prior art has a disadvantage in that it is difficult to manufacture high-quality products of a high gloss due to the dull matt surface of the sheet because of diffused reflection of the convex lenses which show within the limit of the focal distance.

Korean Patent No. 10-0841438 (granted on Mar. 9, 2006) discloses a 'plane lens sheet using light transmission rate difference' which can secure a focal distance by evenly coating refractive resin on the surfaces of convex lenses in order to express stereoscopic images.

Korean Utility Model Registration No. 20-0470351 (granted on Dec. 4, 2013) discloses a 'three-dimensional sheet'. The three-dimensional sheet includes convex lenses of two types which are different from each other in size and radius of curvature, wherein small lenses are arrayed between array spaces of large lenses at the same angle and intervals to have different focal distances, so that three-dimensional images shown on the large lenses disappear but new three-dimensional images are formed by the small lenses when water or liquid is coated on the surfaces of the lenses. However, the three-dimensional sheet according to the prior art has a disadvantage in that image quality is somewhat poor.

Therefore, differently from the methods proposed by the prior arts, the present invention is to show differentiated images.

OBJECT AND SUMMARY OF THE INVENTION

Technical Problem

Accordingly, the present invention has been made in view of the above-mentioned problems occurring in the prior art, and it is an object of the present invention to provide a stereoscopic sheet which has a physical structure for causing a rapid change in view angles to obtain dynamic images, provides a calculation method satisfying formation and requirements of a combined image so as to enable a user to observe the combined image by seeing through a fine area, and accurately grasps a refraction route of light to minimize thickness of the stereoscopic sheet in consideration of a visible screen, a visual route of the eye and characteristics formed during the refraction process in order to observe within a 'near-sighted' distance, thereby creating an intended image.

Technical Solution

In consideration of economic feasibility and problems of prior arts, in order to manufacture products having elaborate and dynamic visual effects, the following conditions must be satisfied:

structural conditions of convex lenses for inducing a change in view angle;

how to obtain a parallax gap value to recognize as the maximum vertex of a combined image at a distance to sense with naked eyes;

how to obtain a parallax gap value of an image combined and recognized by sensing at the minimum proximity distance;

focal distance conditions to recognize stereoscopic combined images applied to the minimum area;

conditions to observe in three-D even within a 'near-sighted' distance while sensing in three-D at a distance over the 'near-sighted' distance;

conditions to sense and recognize an image, which cannot be sensed at the distance over the 'near-sighted' distance, within the 'near-sighted' distance; and conditions to manufacture a thin-layered sheet by minimizing a focus forming distance.

Therefore, to accomplish the above object, there is provided a stereoscopic sheet including: convex lenses arrayed on the top surface of the stereoscopic sheet to intersect at regular intervals; and a printed layer formed at the focal distance of the convex lenses forming the thickness of the sheet, wherein the focal distance of the convex lenses is formed to be at least approximately 3.5 times longer than the pitch, a repetition gap (x5) of printed patterns formed on a portion of a printing area of the printed layer is determined as a pattern gap so that a user can feel depth and projection over a "near-sighted" distance, approximately 10 cm to 25 cm, and the repetition gap (x5) of the printed pattern is approximately 80% to 98% less than a parallax gap (x4) at the minimum proximity distance within the "near-sighted" distance.

Advantageous Effects

The present invention relates to "a stereoscopic sheet having a variable perspective view angle and a thin-layered stereoscopic sheet" having a three-dimensional decorative effect, and provides the following effects.

When a user sees an object over a visual range, in a screen area divided into a three-dimensionally viewed area and an area which is not viewed three-dimensionally, the present invention differentially shows the two areas in three-dimension by causing changes in size and depth of a Moire image in the two areas according to a change in view angle toward a proximity view due to movement of the visible distance. Moreover, when the user sees the stereoscopic sheet in which the clustered printed patterns with different three-dimensional effects are overlapped, according to a change in the visible distance, the stereoscopic sheet according to the present invention provides a visual change in design, for instance, an image which was not viewed is shown newly and an image which was viewed three-dimensionally is disappeared, or a third image is created while images of two kinds are overlapped. Furthermore, an area in which letters or figures are formed are within a range of 0.3 mm to 3 mm in width, the stereoscopic sheet according to the present invention enables the user to recognize pattern images in which letters or figures are printed within the 'near-sighted' distance and to recognize at least one combined image (Moire image). Additionally, the stereoscopic sheet according to the present invention can be used as a film for injection by having the minimum thickness overcoming the limit of the focal distance or by being manufactured as a thin-layered sheet, thereby providing high machinability.

Therefore, the present invention can produce decorative sheets which is capable of being used for furniture and interior design having various design effects and for surfaces of electronic products by causing dynamic changes to portions, which are seen three-dimensionally according to distances.

EXPLANATION OF REFERENCE NUMERALS IN DRAWING

Figure 1:
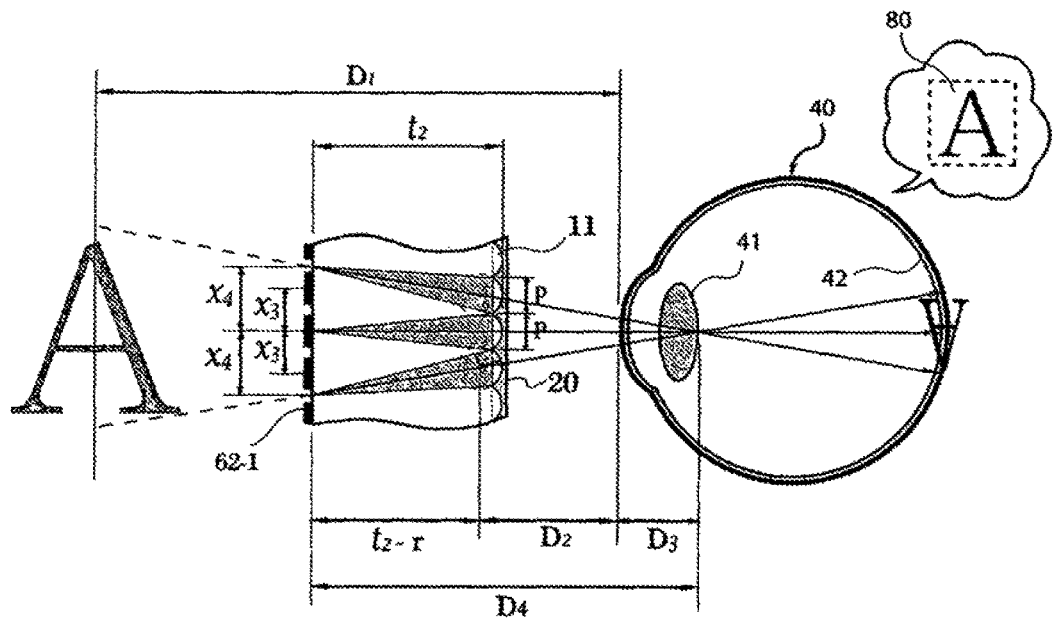
FIG. 1 is a sectional view illustrating a vision route of eyes to see through a stereoscopic sheet and structural features of the stereoscopic sheet according to a preferred embodiment of the present invention.

1: stereoscopic sheet
10: lens layer
11: convex lens
15: magnifying glass lens
20: refractive resin layer
30: protective film
40: eyeball
41: crystalline lens
42: retina
43: eye surface
44: vision intersection point
50: thickness layer
50-1: thickness layer (transparent layer) ranging from defocus distance printed layer to reflection layer
60: printed layer
60-1 defocus distance printed layer
61: pattern printed plane
61-1: printed pattern formed on pattern printed plane
62: variable view angle recognizing pattern plane
62-1: printed pattern formed on variable view angle recognizing pattern plane
65: second printed layer
70: reflection layer
80: One Moire pattern image
D: visible distance
D1: 'near-sighted' distance D2: distance from the eye surface to the center of the convex lens
D3: distance from the eye surface to the vision intersection point of the crystalline lens
D4: distance from vision intersection point of the crystalline lens to printed layer
Dt: Visible distance of Moire depth recognized from the surface of lens sheet
I: size of one Moire image
P: pitch (lens array interval)
r: radius of convex lens
t: focal distance
t1: focal distance of general lens
t2: focal distance of lens applied with refractive resin
t3: distance from the surface of curvature radius of convex lens to reflection layer
t4: distance from reflection layer to 'focal distance printed layer' or 'defocus distance printed layer'
x: parallax value
x1: vision peak parallax gap over near-sighted point of convex lens sheet
x2: value of the parallax gap of convex lens sheet
x3: vision peak parallax gap over near-sighted point of sheet coated with refractive resin
x4: value of the parallax gap of sheet coated with refractive resin
x5: repetition gap of printed patterns

DETAILED DESCRIPTION OF THE EMBODIMENTS

Hereinafter, in consideration of structural characteristics of a lens sheet causing a change in view angle according to a visible distance and disadvantages of the stereoscopic sheets according to the prior arts, a stereoscopic sheet by a variable view angle will be described in detail as shown.

Figure 2:
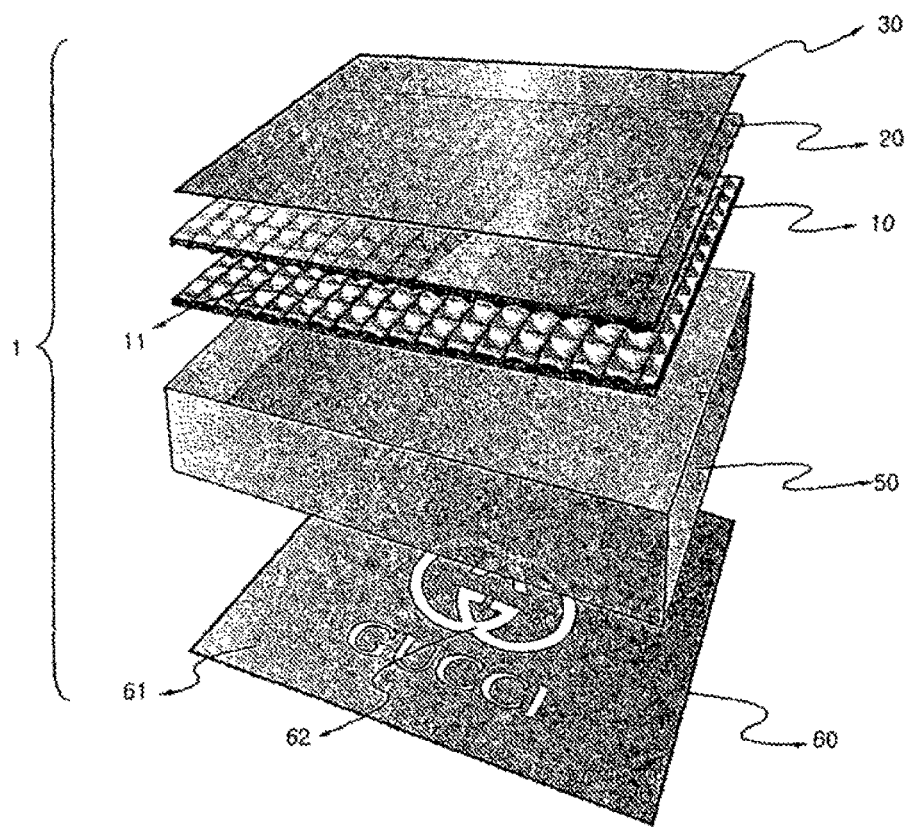
FIG. 2 is an exploded perspective view showing a laminated structure of the stereoscopic sheets.

FIGS. 1 and 2 are a sectional view and an exploded perspective view for explaining the present invention. The stereoscopic sheet according to the present invention includes: a lens layer 10 having convex lenses 11 which are made of a transparent material and are arrayed to intersect at regular pitch distances at right angles or at an angle of 60 degrees; and a refractive resin layer 20 which is coated and hardened on the top surface of the lens layer 10 and has a refractive index lower than a refractive index of the convex lenses 11. The refractive resin layer 20 is made of transparent UV hardening resin or bond resin. The stereoscopic sheet according to the present invention may further include a protective layer 30 which is bonded or adhered with the refractive resin layer 20. Preferably, the protective layer 30 is used as a protective film or a substrate layer according to purposes of use, and may be omitted.

A focal distance (t2) is formed below the lens layer 10 by the refractive index and the curvature radius of the convex lenses 11 and the refractive index of the refractive resin layer 20. A thickness layer 50 made of transparent resin is formed at an interval of the focal distance. A printed layer 60 which is viewed by passing through the lens layer 10 and the refractive resin layer 20 is formed below the thickness layer 50 through graphics or figure patterns. General pictures which are not seen three-dimensionally and the figure patterns which are seen three-dimensionally are printed, and the figure patterns are printed or formed in an embossed form inside the printed layer 60.

However, because portions which are seen three-dimensionally are differentially divided and expressed by changes in view angles according to a visible distance, the printed layer 60 includes: a three-dimensional pattern part 61 which is seen three-dimensionally at the visible distance over a 'near visual point'; and a pattern zone 62-1 formed by a proximity parallax where a user can visibly observe even at a distance below 'near visual point'.

Figure 3:
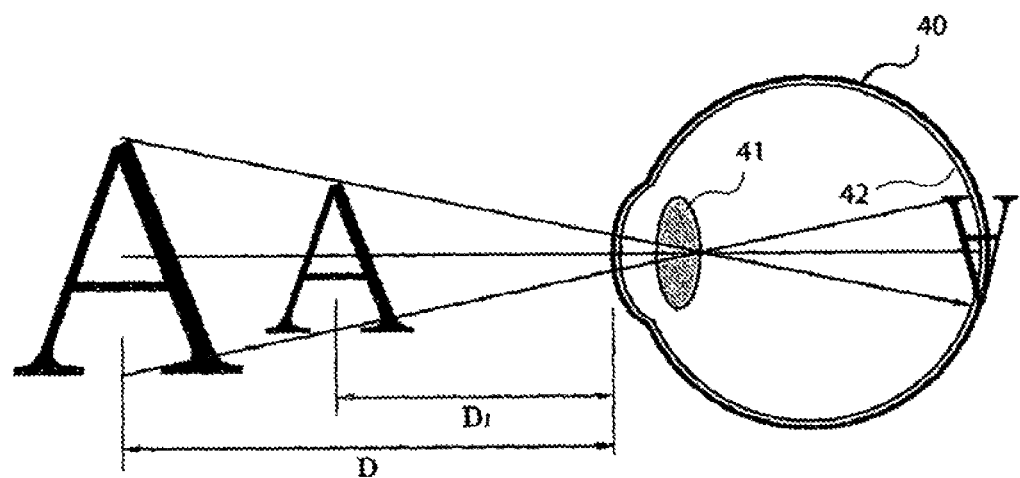
FIG. 3 is a sectional view showing a general vision route of eyes.
Figure 4:
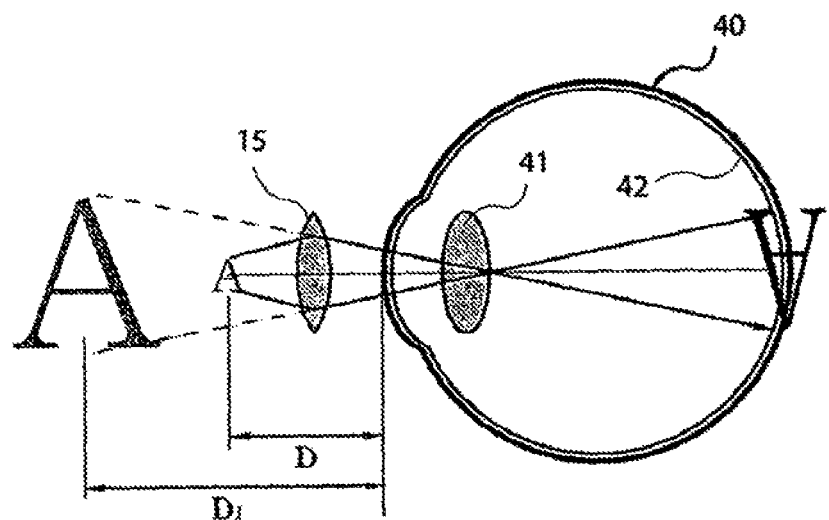
FIG. 4 is a sectional view illustrating an object observation vision route through a single convex lens of the eye.
Figure 5:
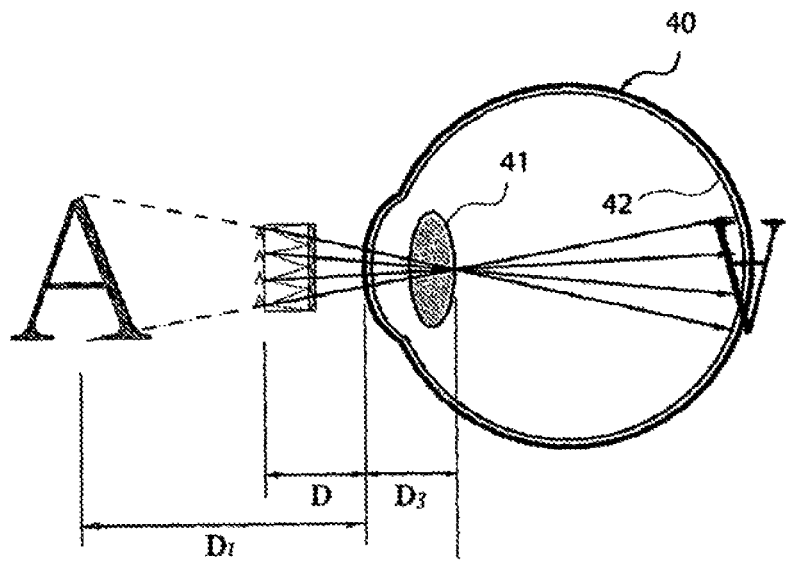
FIG. 5 is a sectional view illustrating a vision route of the eye according to a preferred embodiment of the present invention.

As shown in FIGS. 3 to 5, 'near visual point' means the closest distance that a human being can see an object clearly with the eyes, and is also called 'visual range'. The 'near visual point' (D1) is about 10 cm in case of teenagers, is about 25 cm in case of adults, and increases to about 1 m due to presbyopia when the adults get old. Therefore, because the visible 'near-sighted' distance (D1) differs depending on ages, the present invention is described on the supposition of healthy adults' visible observation.

FIGS. 3 to 5 illustrate sight of the eye and a path of light to explain a structural difference that an image is recognized from the brain according to how to form the image on the retina through sight of the eyes and the lenses.

FIG. 3 illustrates a state where letters or figures which are as far as the 'near-sighted' distance (D1) are recognized. For instance, a letter 'A' is generally seen with naked eyes when the letter 'A' is formed on the retina 42 into a reverse image and the brain recognizes the image of the letter 'A' after the letter 'A' passes through the convex lens, namely, the crystalline lens 41, of the eye. Therefore, when the user observes an object at the visible distance (D) within the 'near-sighted' distance (D1), because a focus is not formed on the retina of the eye, the image is viewed blur.

Therefore, as shown in FIG. 4, even though the letter 'A' is located within the 'near-sighted' distance (D1), when the user observes it through one magnifying glass lens 15, the convex lens 15 is controlled in the view angle to form a focus on the retina, and then, the letter 'A' can be recognized from the brain as shown in FIG. 2.

FIG. 5 illustrates the situation that the stereoscopic sheet having a variable perspective view angle according to the present invention is viewed in such a way that letters 'A' located within the 'near-sighted' distance (D1) are recognized into a combined image by the convex lenses. The letters 'A' are arrayed at the location where the convex lenses of a lens array form focus so as to form a pattern on the lens array at a predetermined array angle, and then, a combined image of the Moire phenomenon is recognized three-dimensionally by a vision parallax gap passing the center of the convex lenses and a difference in pattern density of the letters 'A'. As shown in FIG. 2, the combined image is an image formed on the retina through the lenses and is recognized like the user looks an image which is located farther than the 'near-sighted' distance (D1).

Therefore, referring to FIGS. 6 to 9, according to a preferred embodiment of the present invention, differences in effect to reach the present invention according to differences in configuration method of the stereoscopic sheet by the lens array will be described.

There is a 'visible distance (D)' which is a proper distance between a human being's eyes and an object to observe the object. In general, in order to measure the visible distance, a distance from the eyes to the object is measured using a tape measure. However, in the present invention, because it is important to obtain a correct vision and a parallax value of the stereoscopic sheet, the following standards are needed.

Figure 9:
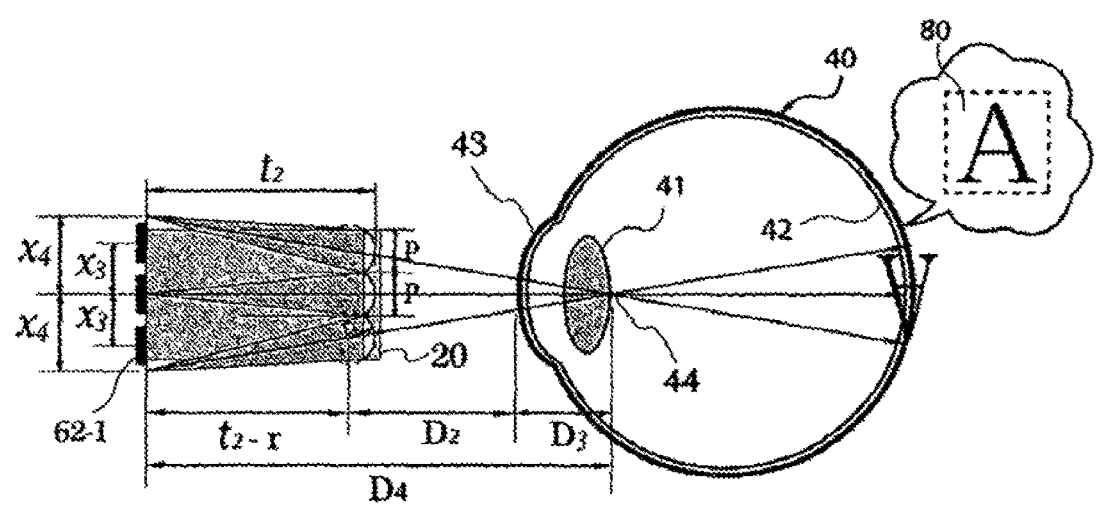
FIG. 9 is a sectional view of the stereoscopic sheet on which a refractive resin layer, illustrating parallax gap to the proximity visible distance according to the preferred embodiment of the present invention.

In other words, there are a few differences between human beings, but, a person recognizes an image formed on the retina by the crystalline lens 41, and in this instance, an object focal point of the crystalline lens 41 is about 13 mm, and a focal point distance in image space formed on the retina is about 23 mm. Moreover, because the viewed image passes the central axis of the crystalline lens 43 and the brain recognizes the image formed on the retina, on an assumption of the 'minimum proximity vision' to observe the object as close as possible to the eyes, as shown in FIG. 9, a 'vision intersection point' 44 where the image is reversed on the inner curved surface of the crystalline lens, and it will be a start point of a view angle.

Therefore, assuming that the thickness of the eyelid is about 3 mm and the minimum proximity distance with the object is about 5 mm, in case of human beings, because a distance from the eye surface 43 to the vision intersection point 44 of the crystalline lens is average 7.2 mm, an accurate visible distance must contain the interval. Therefore, because a distance from the start point of the perspective view angle to a target is about 15.2 mm, the vision angle (D4) must be calculated involving an extension distance (D3) inside the eye.

In case that the visible distance is measured, an error mainly occurs when a value that measured a distance from the eye surface 43 to the object is calculated. Particularly, when an observation distance at the visible distance within the 'near-sighted' distance (D1) is measured, such a problem has a great influence on a numerical value according to view angles. Accordingly, as shown in FIGS. 6 to 9, when the measurement distance (D4) including the distance (D3) from the eye surface 43 to the vision intersection point 44 of the crystalline lens, a distance D2 from the eye surface to the center of the convex lens 11 and a distance from the center of the convex lens to the printed layer 60 is substituted, a parallax value (x) viewed through the center of the convex lenses 11 can be obtained.

That is, as shown in FIG. 5, because the combined image of the Moire phenomenon is viewed three-dimensionally according to the parallax gaps viewed by passing the center of the convex lenses and a difference in pattern density of the repeated figures, when a difference between the repetition gaps of the printed pattern and the parallax value (x) is calculated in advance, the size, because the depth and the projection of the stereoscopic image recognized by the difference, an intended effect can be obtained when the parallax value (x) viewed through the center of the convex lens is calculated in advance.

In general, Moire stereoscopic technique using the lens array is a conventional method to produce a stereoscopic sheet by a halftone interval of printed patterns within a range of 98% to 102% around a lens pitch. However, such a standard does not apply a change according to visible distances. Therefore, the size and interval of patterns recognized according to the purpose of design must be decided. However, because the view angle is varied according to the visible distances of a target viewed outside 1M and an object viewed at a short distance within 1M, it is preferable to manufacture the stereoscopic sheet to decide the interval of the printed patterns according to an accurate visible distance standard.

Therefore, 'vision peak parallax gap (x1)' according to the visible distance must be set, and based on the vision peak parallax gap (x1), a gap value of printed patterns with sense of depth and projection must be decided. Furthermore, based on the 'vision peak parallax gap', a difference in depth level of the stereoscopic sheet is controlled by a density value of the printed patterns which are small and large.

However, when the figure patterns 61 and 62 printed at density of the 'vision peak parallax gap' from the previously set visible distance, the user cannot never recognize the three-dimensional effect at the visible distance.

Namely, the three-dimensional effect must be expressed when Moire 70 is generated by a difference between the parallax gap through the convex lenses and the density gap of the printed patterns. However, because the parallax to view and the gap of the printed patterns are the same, the user cannot recognize a three-dimensional Moire 80, and finally, it becomes a vision peak gap or an infinite distance. Additionally, the vision peak parallax gap (x) is not the same as a lens pitch gap, and can be obtained through the following formula.

$$X=P(D_2+D_3+t_2-r)/D_2+D_3 \quad \text{Formula 1}$$

Therefore, when the vision peak parallax gap is found accurately according to an observation distance and the change recognized by the naked eyes according to a change in visible observation distance is maximized using features of the parallax gap varied depending on the observation distance, the stereoscopic sheet having a variable view angle can be manufactured.

Figure 6:
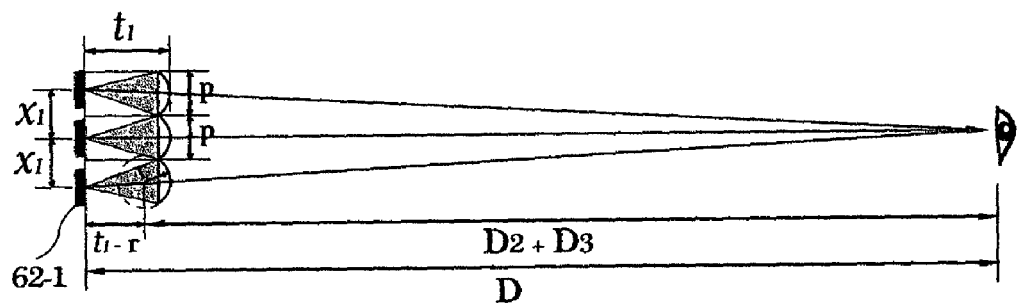
FIG. 6 is a sectional view illustrating a parallax gap to a visible distance according to the preferred embodiment of the present invention.
Figure 7:
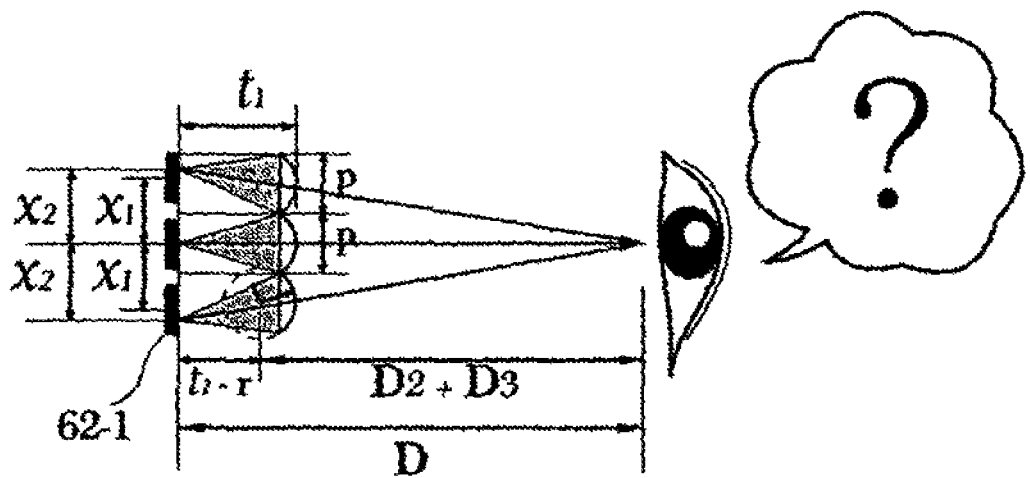
FIG. 7 is a sectional view illustrating a parallax gap to a proximity visible distance according to the preferred embodiment of the present invention.

FIGS. 6 and 7 illustrate the preferred embodiment of the present invention using a general convex lens sheet.

For instance, referring to FIG. 6, when a lens pitch (P) is 1 mm, an observation distance (D) is 1200 mm, a focal distance (t1) is 1.8 mm and the radius of curvature (r) is 0.6 mm, a value of the vision peak parallax gap (x1) obtained by the above-mentioned formula is 1.001 mm. Moreover, as shown in FIG. 7, assuming that the observation distance (D) is 250 mm under the same conditions, the value of the parallax gap (x2) is 1.0048 mm, and so, a difference in parallax gap according to the observation viewpoint is 0.38%.

However, the stereoscopic image recognizing technique by the Moire 80 provides a clear three-dimensional effect at the density difference of about 1% to 9% based on the vision peak parallax gap, and shows a severe three-dimensional change even by a small numerical change within the density difference of about 1% to 2%. Therefore, because the difference in the parallax value calculated above is just the density difference of 0.38% which is less than 1%, finally, a value of extremely slight change of the view angle beyond recognition of the change of the three-dimensional image according to the visible distance is obtained. Accordingly, the stereoscopic sheets with the general focal distance according to the prior arts cannot reach the purpose and object of the present invention.

Therefore, in order to solve the problems of the prior arts, the focal distance is extended to obtain favorable view angle changes.

Accordingly, under the same conditions as the above-mentioned lens conditions, as shown in FIG. 6, assuming that the focal distance is changed to 5 mm, if it is calculated through the above-mentioned formula, the vision peak parallax gap (x1) according to the observation position when the observation distance (D) is 1200 mm is about 1.0036 mm. In addition, under the same conditions, as shown in FIG. 7, assuming that the focal distance is 5 mm and the observation distance (D) is 250 mm, it is calculated that the parallax gap (x) is 1.0179 mm. Accordingly, there is a view angle change of about 1.4%, and so, a clear change in the three-dimensional image can be obtained.

That is, even though the parallax gap change of 1.4% is the same change of the observation viewpoint, as the focal distance is extended, it is an important factor to produce an active change of three-dimensional images.

Therefore, preferably, the stereoscopic sheet according to the present invention is manufactured such that the value of the vision peak parallax gap (X1) is obtained through the formula and the value of the parallax gap (x2) according to the change in visible distance is obtained, and a desirable focal distance (t1) to obtain the two parallax gap values is about 3.5 times more than the pitch (P) of the lens. Because the parallax gap difference according to the visible distance gets greater when the focal distance becomes longer, changes in more active stereoscopic combined images can be recognized.

Figure 8:
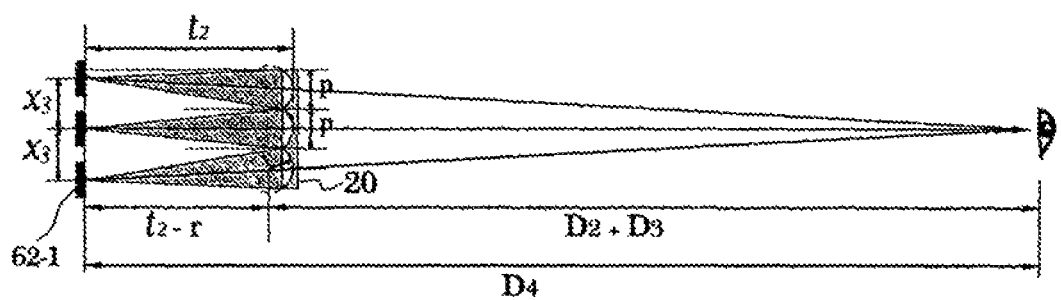
FIG. 8 is a sectional view of a stereoscopic sheet on which a refractive resin layer, illustrating parallax gap to the visible distance according to the preferred embodiment of the present invention.

FIGS. 8 and 9 illustrate that the present invention is applied to the surface of a small-sized product like a smart phone that the user holds in his or her hand. In this instance, the present invention requires expression within a shorter observation distance and also requires thinner sheet. The sheet has a focal distance with thickness of about 0.8 mm, for instance, the sheet is a fine micro lens which is about 0.1289 mm in pitch, about 0.294 mm in curvature radius of the lens and is 1.48 in refractive index.

However, for mass production of the micro lens array sheet, a mold is needed, but, it requires lots of manufacturing costs, it is difficult and complicated to secure a curvature radius to control thickness.

Therefore, in order to solve the above-mentioned problems, the lens layer 10 has the curvature radius (r) of about 0.06 mm to be manufactured easily, and instead of obtaining the focal distance (t1) by the curvature radius of 0.294 mm, the transparent refractive resin 20 having a refractive index of about 1.45 is coated and hardened on the top surface of the lens layer 10, so that the focal distance (t2) of about 0.8 mm can be obtained by a difference between the refractive index of the lens, 1.58, and the refractive index of the refractive resin, 1.45.

FIG. 8 illustrates that the refractive resin layer 20 is formed at the position where the refractive resin layer 20 touches the surface of the convex lens layer 10. As described above, because the present invention can obtain a useful effect according to the variable view angle when the focal distance (t2) contrasted with the pitch (P) of the lens is formed longer, the focal distance (t2) is 0.8 mm when the pitch (P) of the lens is 0.1289 mm, and it means that the focal distance (t2) of about 6.2 times longer than the pitch (P). As shown in FIGS. 8 and 9, because the visible distance $D4=D_2+D_3+t_2-r$, if the parallax gap is calculated by the formula assuming that the visible distance (D4) is 250 mm, $x3=0.1289\times(242.06+7.2+0.8-0.06)/242.06+7.2=0.12925$. Accordingly, the vision peak parallax gap (x3) is about 0.12925 mm.

FIG. 9 illustrates the state where the stereoscopic sheet is observed at the visible distance (D4) within the 'near-sighted' distance. If the visible distance is short, the change in perspective view angle gets worse. Therefore, as described above, the visible distance must be calculated accurately from the vision start point within the eye to the position of the object.

Therefore, considering that the distance from the visual intersection point 44 within the eye to the eye surface 43 is about 7.2 mm and in consideration of the eyelid and eyebrow from the eye surface and the facial skeleton, because the thickness of the sheet is about 0.8 mm if the minimum vision gap against the surface of the object is about 7 mm, the accurate visible distance (D4) is about 15 mm.

Of course, as shown in FIG. 5, there is the method to see within the 'near-sighted' distance with naked eyes. Because the 'vision route' is an extension line of a straight line passing through the center of the convex lenses 11 from the visible intersection point 44 inside the eye, when the curvature radius (r) of the convex lens is about 0.06 mm, the distance (D2) from the eye surface 43 to the center of the convex lenses 11 is 7.06 mm, and a value that the value of the curvature radius (r) of the convex lens is subtracted is 0.74 mm. Therefore, by the above-mentioned formula using the above values, the parallax gap (x4) to see the stereoscopic sheet at the minimum proximity distance is obtained as follows:

$$0.1289(7.06+7.2+0.8-0.06)/7.06+7.2=0.1355 \text{ mm}.$$

Therefore, when the vision peak parallax gap (x3) of about 0.1293 mm and the parallax gap (x4) of 0.1355 mm at the proximity distance are compared with each other, there is a density difference of about 4.6%. Finally, based on the parallax gap (x4) of 0.1355 mm, if the three-dimensional patterns 62-1 are printed at pattern intervals within a range of about 4.6%, it provides a clear three-dimensional effect by the changed perspective view angle.

However, in order to recognize the three-dimensional effect even at the distance over the 'near-sighted' distance and to recognize the three-dimensional effect even at the minimum proximity distance within the 'near-sighted' distance, a parallax value (x3) of the printed patterns must be obtained as follows.

To see objects means that only objects existing over the 'near-sighted' distance (D1) can be seen. As described above, the stereoscopic sheet according to the present invention is a sheet enables the user to see and discriminate the objects even at the minimum proximity distance within the 'near-sighted' distance. Because the sheet of the present invention is made by the convex lenses 11, as shown in FIGS. 4 and 5, the user sees the object located within the 'near-sighted' distance (D1) with the naked eyes, but may feel like the user sees the object located over the 'near-sighted' distance by the convex lenses.

Therefore, even though the user sees the object with the eyes touching the surface of the sheet if the object is viewed to be located about 25 cm further back than the surface of the sheet due to the depth of the Moire 80 to show three-dimensionally, it seems to see the object located at the distance over the 'near-sighted' distance. Therefore, the printed patterns must have an array interval so that the three-dimensional image seems to be about 10 cm to 25 cm further back than the surface when it is viewed at the visible distance.

Figure 10:
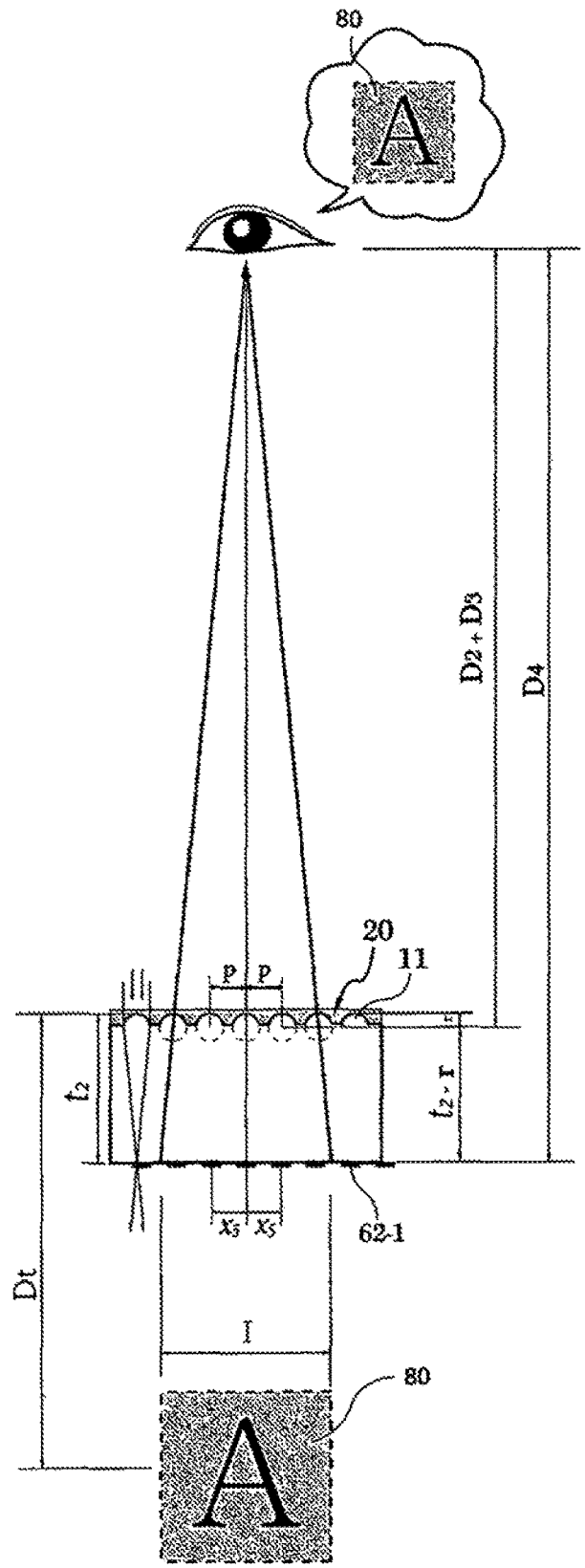
FIG. 10 is a sectional view of the stereoscopic sheet securing a visible distance over a "near-sighted" distance according to the preferred embodiment of the present invention.

FIG. 10 illustrates the stereoscopic sheet which secures a visible distance over the 'near-sighted' distance according to the preferred embodiment of the present invention.

The structure of the printed patterns which is seemed to be 25 cm further back may be varied according to the size, the curvature radius and the focal distance of the convex lenses. For instance, the focal distance (t1) of a lens sheet in which the convex lens is 0.254 mm in pitch, 0.155 mm in curvature radius and 1.585 in refractive index is about 0.42 mm. In this instance, if the refractive index of the refractive resin 20 coated on the surfaces of the convex lenses 11 is 1.506, the focal distance (t2) is about 3.1 mm. The sheet in which the lens is 0.254 mm in pitch and 3.1 mm in focal distance has the same focal distance as the sheet in which the lens is about 1.144 mm in curvature radius. In order to make the depth (Di) of the combined image, which is seen three-dimensional at the focal distance, seen about 250 mm further back than the 'near-sighted' distance, the sheet can be manufactured through the following formula using an extended focal distance and the vision parallax as follows.

$$D_1=(t_2-r)(D_2+D_3)I/[P(D_2+D_3)-(t_2-r)I] \qquad \text{Formula 2}$$

Therefore, if $(3.1-1.144) \times 400 \times I/[0.254 \times 400-(3.1-1.144) \times I] < 250$ mm is used, the three-dimensional image seen at the visible distance (D2+D3), about 40 cm, I=19.978 mm.

In other words, the three-dimensional image of which the repetition gap (I) of one Moire 80 is 19.978 mm is recognized to have the depth (Di) of about 250.000467 mm by the above formula, and it secures the depth (Dt) of 250 mm or more, so that the image becomes about 7.38 times thicker than the existing focal distance (t1). Finally, the user can recognize the Moire image clearly at all visible distances around the 'near-sighted' distance.

Moreover, when it is calculated by the formula 1, because the vision peak parallax gap (x3) of about 0.254 mm shows a visible infinite distance, the repetition gap (x5) of the printed patterns which are recognized with the depth (Di) of about 250 mm is smaller than the peak parallax gap (x3). Because the three-dimensional pattern 80 recognized as the three-dimensional combined image, namely, the size of one Moire, is seen to be combined by the convex lenses, the number of the convex lenses is calculated, and the gap (x5) of the printed patterns is calculated, it is about 0.2508 mm.

Therefore, it is found that the gap is about 98.7% smaller than the pitch of 0.254 mm, and it means that the difference is widened when the focal distance gets longer and the proximity distance gets shorter.

Therefore, the stereoscopic sheet according to the present invention can obtain effects when it has the focal distance farther than that of conventional lens sheets. Decorative products for construction interior are generally glass-processed products of 3 mm or more, but decorative sheets used for electronic products must be made thin according to the products. Therefore, in the present invention, because that the focal distance gets farther is means that the stereoscopic sheet becomes thicker, if necessary, the sheet may be manufactured to be thin.

FIGS. 11a to 12b illustrate a stereoscopic sheet according to another preferred embodiment of the present invention. If the focal distance (t2) gets longer by the refractive resin 20 coated on the surface of the convex lens layer 10 and the sheet is made to be excessively thick, it deteriorates economic feasibility and machinability. Therefore, under the same focal distance conditions, thickness of the sheet may be reduced as follows.

Figure 11A:
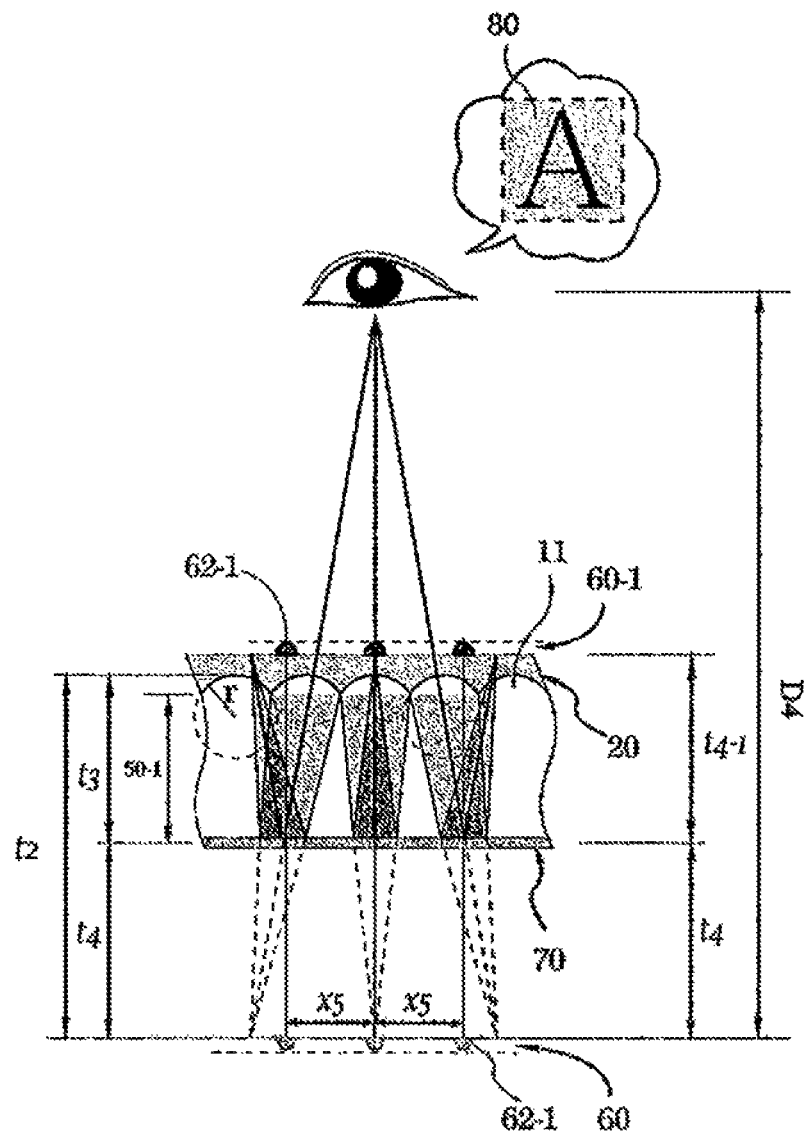
FIG. 11a is a sectional view of the stereoscopic sheet of which the focal distance is controlled by a defocus distance printed layer and a refractive layer according to another preferred embodiment of the present invention.
Figure 11B:
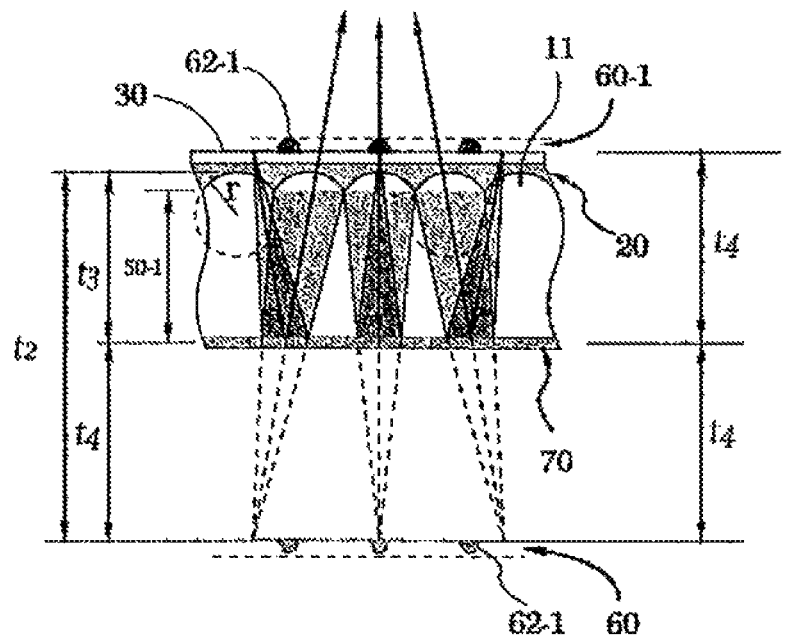
FIG. 11b is a sectional view of the stereoscopic sheet of which the focal distance is controlled by a defocus distance printed layer and a refractive layer according to a further preferred embodiment of the present invention.
Figure 11C:
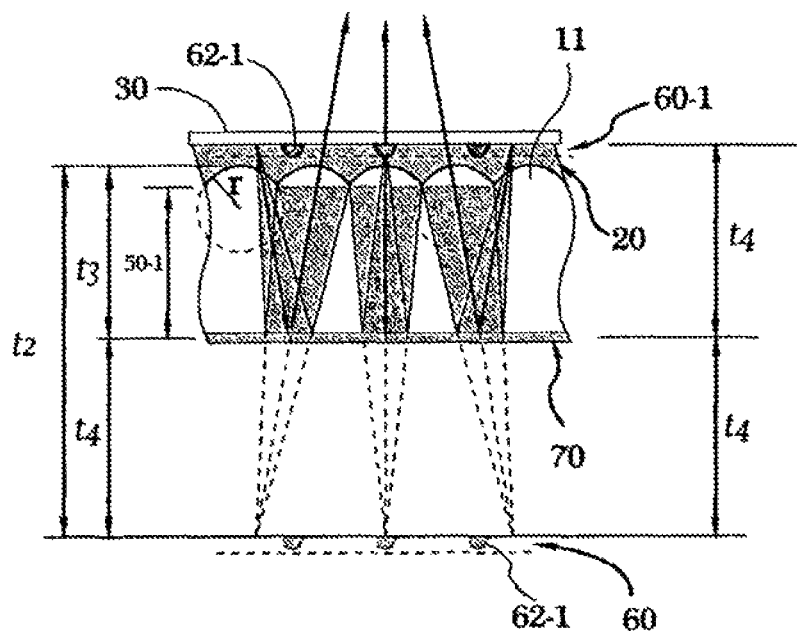
FIG. 11c is a sectional view of the stereoscopic sheet of which the focal distance is controlled by a defocus distance printed layer and a refractive layer according to a still further preferred embodiment of the present invention.

As shown in FIGS. 11a to 11c, a reflection layer 70 is formed between the convex lens and the focal distance (t2) to form a sheet thickness from the convex lens to the reflection layer. Instead of the printed layer 60 formed at the original focal distance (t2), a defocus distance printed layer 60-1 is formed at the same distance (t4) above the convex lenses 11 from the reflection layer 70 as long as the gap (t4) from the reflection layer 70 to the original focal distance (t2).

The reflection layer 70 is formed at nearly under half the range from the surface of the refractive resin 20 formed on the top of the convex lens layer 10 to the original focal distance (t2), and a focus is formed on a defocus distance printed layer 60-1 which is newly formed by incident light of the convex lenses 11 reflected to the reflection layer 70.

In other words, in order to see the printed pattern 62-1 formed on the printed layer 60-1, light passes the center of the convex lenses 11 after passing through the printed layer 60-1 of the defocus distance from the naked eyes, and then, is reflected at the reflection layer 70. After that, the light passes the convex lenses 11 from the reflection layer 70 to see through the patterns 61-1 and 62-1 printed at an interval (r4) of the defocus distance printed layer 60-1 so as to show the three-dimensional effect at nearly under half thickness (t4-1) compared with the thickness of the original stereoscopic sheet.

Furthermore, the light is reflected from the reflection layer 70, and is gradually narrower in focus while passing the convex lenses 11. Because the focal distance becomes shorter, because the focal distance gets shorter when the distance from the convex lens 11 to the reflection layer 70 or a transparent layer 50-1 gets shorter, the stereoscopic sheet according to the present invention can be ⅓ less than the original stereoscopic sheet. Accordingly, the stereoscopic sheet according to the present invention can be used as a thin-layered stereoscopic sheet to mainly see through the three-dimensional patterns 61-1.

Because the user may feel shorter three-dimension effect if the focal distance is too short, the defocus distance printed layer 60-1 must be formed as close as possible to the surface of the convex lens in order to see through the pattern plane 62-1 for recognizing a variable view angle. Accordingly, the stereoscopic sheet according to the present invention can be manufactured to be about a half of the thickness of the original stereoscopic sheet or to control correlations between the refractive index and curvature radius of the convex lens and the refractive index of the refractive resin.

Of course, the image is not recognized by the naked eyes when it first passes the printed pattern 62-1, but it is recognized when being reflected and points to collect light on the printed layer 60-1 are combined. So, because there is no distortion when the reflection layer 70 has good mirror-like effect, it is preferable that the reflection layer 70 be formed utilizing the metalizing method.

FIG. 11b shows application of the stereoscopic sheet shown in FIG. 11a. The protective layer 30 is formed on the top surface of the convex lens layer, and the defocus distance printed layer 60-1 is formed on the top surface of the protective layer. On the defocus distance printed layer 60-1, a general printing and three-dimensional pattern printing plane 61 and a variable view angle recognizing pattern plane 62 are printed. According to purposes, in an aspect of design, it is preferable that general printing be printed on the bottom surface of the protective layer 30 to keep the surface gloss of the generally printed surface by the protective film 30 because it is regardless to the focal distance. Alternatively, the surface of the convex lens layer 10 and the bottom surface of the protective layer 30 may be bonded with each other by the refractive resin 20.

Therefore, as shown in FIG. 11c, the bottom surface of the protective film 30 becomes a focus reaching position, and the defocus distance printed layer 60-1 is formed on the bottom surface of the protective film 30 and is bonded to the surface of the convex lens layer 10, so that the user can apply the sheet as the user prefers.

Figure 12A:
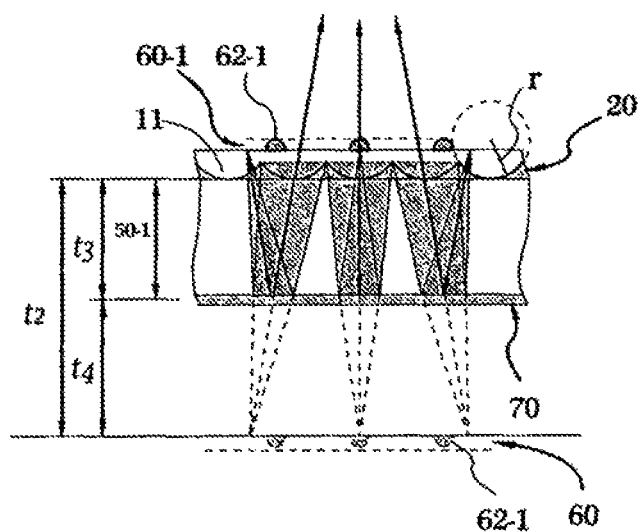
FIG. 12a is a sectional view of the stereoscopic sheet having a downward curvature radius surface in a state where a convex lens layer is turned upside down according to another preferred embodiment of the present invention.

FIG. 12a shows another preferred embodiment of the present invention. In a state where the convex lens layer 10 is turned over, the surface of the curvature radius is located downward. The convex lens layer 10 is adhered or bonded to the thickness layer 50-1 of the sheet by the refractive resin 20, and the defocus distance printed layer 60-1 is formed on the top surface of the turned convex lens layer. Because the curvature radius direction of the lens is changed and the position of the center of the lens is also changed, the location of the view angle passing the center of the convex lens on the vision route is changed in the center as shown in the drawing, so that the difference of the parallax to be viewed becomes larger. Of course, this method may be also used to the stereoscopic sheet shown in FIG. 10, and through the method, the focal distance and the thickness of the sheet are lessened.

Figure 12B:
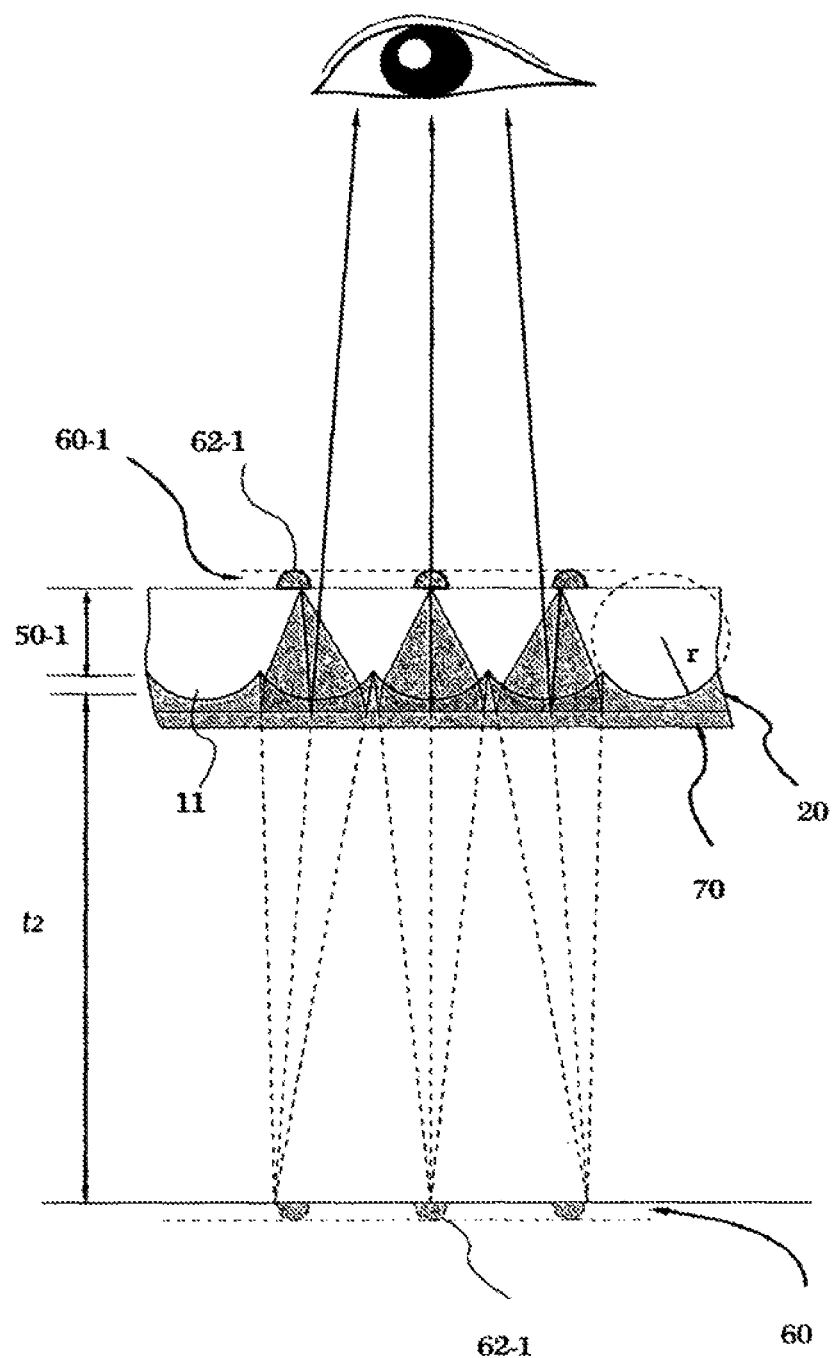
FIG. 12b is a thin-layered stereoscopic sheet having a downward curvature radius surface in a state where a convex lens layer is turned upside down according to another preferred embodiment of the present invention.

FIG. 12b illustrates a method to manufacture a stereoscopic sheet capable of being seen with the naked eyes as thin as possible. In a state where the convex lens layer 10 is turned over, the surface of the curvature radius is located downward, the refractive resin 20 is formed flat on the bottom surface of the convex lens, and the reflection layer 70 is formed on the surface of the refractive resin 20 to reflect incident light.

However, as shown in the drawing, the stereoscopic sheet gets remarkably thinner. Because the image passes the convex lens 11 from the incident light and is reflected from the reflection layer 70, and then, is recognized with the naked eyes by passing the convex lens twice while reaching the defocus distance printed layer 60-1 after passing the convex lens, the focus forming angle is remarkably refracted while passing the convex lens twice. Therefore, as described above, because the thickness of the sheet capable of being recognized with the naked eyes is ⅓ less than the original focal distance (t2) that passes the convex lens once, a thin-layered stereoscopic sheet can be manufactured.

Of course, as shown in FIGS. 11b and 11c, the defocus distance printed layer 60-1 is printed on the top surface or bottom surface of the protective film 30 so as to form the protective film 30. Of course, a protective film 30 printed or unevenly formed may be additionally adhered on the top surface of a transparent layer 50-1.

Figure 13:
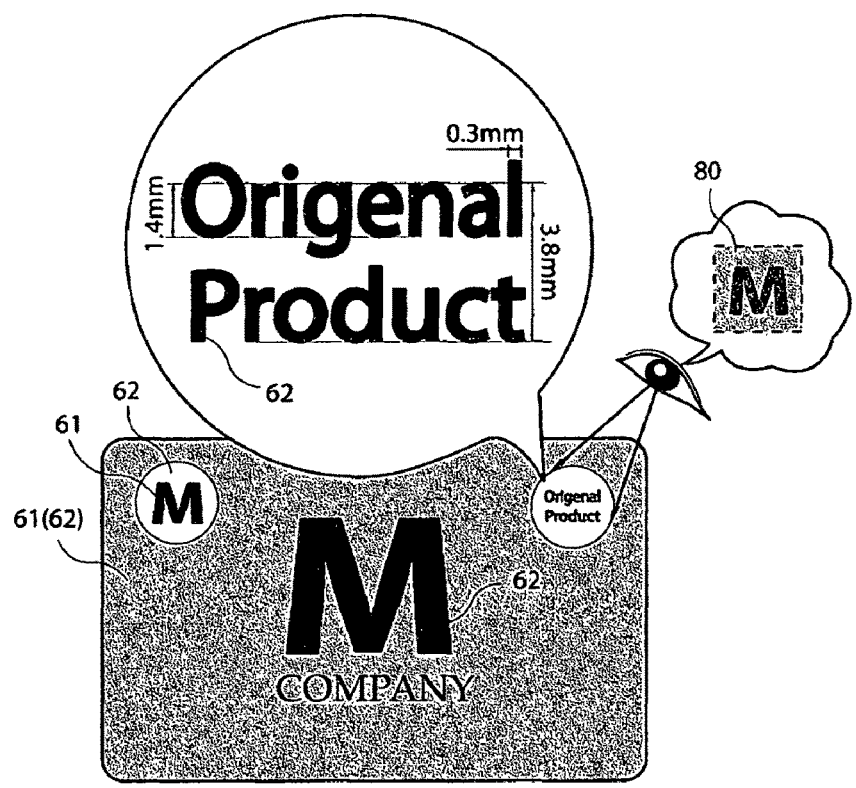
FIG. 13 is a plan view showing a form of a printed pattern plane formed on a printed layer of the stereoscopic sheet according to the preferred embodiment of the present invention.

FIG. 13 illustrates a graphic design of the stereoscopic sheet and forms of the printed patterns 61-1 and 62-1. Another advantage of the present invention is a marking function, and so, a pattern image 62-1 printed at a 'small area' can be recognized through the minimum proximity view.

The 'small area' view means a part of the stereoscopic printed planes 61 and 62 formed on the printed layer 60 having figures, lines and letters with the width of at least 3 mm or less. When the pattern figures formed inside the small area can be recognized as a combined image of at least one Moire 80 through proximity sight. In order to maximize the effect, a smaller area is more desirable.

Therefore, the present invention can see through figures to the minimum area with the width of 1 mm or less. In order to recognize the image 80 printed in the area, the stereoscopic sheet may be manufactured through the following method.

As described above, in the 'small area vision, at least one combined image 80 must be seen inside the minimum area, and it can be controlled in such a way that the size of the combined image viewed is recognized to be small when the lens is small and the focal distance is long.

Therefore, the size of the graphic pattern 80 recognized with the naked eyes is very important. Because the size of the combined image is decided according to intervals and focal distance of patterns printed, as shown in FIGS. 6 and 7, if application of the general convex lens sheet is calculated through the above-mentioned formula, because the lens is 0.1289 mm in pitch (P), 1.58 in curvature index and 0.06 mm in curvature radius (r), the focal distance (t1) is about 0.163 mm. If the minimum proximity distance (D2+D3) is 15 mm, the parallax (x2) between the lenses at the minimum proximity distance is about 0.1298 mm.

Furthermore, because the peak parallax gap (x1) between the lenses at the visible distance (D2+D3) of 400 mm is about 0.12893 mm, the numeral value is a criterion of the printed pattern gap (x1), and as described above, the image is printed smaller than 0.12893 mm because the depth of the near-sighted distance, about 250 mm, must be expressed.

Therefore, According to the above-mentioned formula, the size (I) of one Moire having the depth of about 250 mm at the 'near-sighted' distance is 192.535 mm, and the printed pattern gap (x5) is 0.12881 mm.

Because the parallax (x2) viewed at the minimum proximity distance (D2+D3) of 15 mm is about 0.1298 mm, the printed pattern of 0.12881 mm makes a pattern size (i) of one Moire 80 by the proximity vision parallax (x2), and it is observed in size of about 7.6 mm. Finally, because the minimum width of the figure must be about 7.6 mm, there is a problem in that one combined image 80 cannot be observed and recognized properly under the 'small area' of 3 mm or less.

Therefore, assuming that the focal distance (t2) is changed from 0.163 mm to 0.8 mm under the same conditions, the present invention will be described. When pitch (P) of the lens is 0.1289 mm, the curvature radius (r) is about 0.295 mm. Therefore, by the formula 2, the depth over the 'near-sighted' distance and the pattern size (i) of one Moire 80 can be obtained as follows:

$$(0.8-0.295)400 \times I/[(400 \times 0.1289)-(0.8-0.295)I]=250.$$

Accordingly, the size of one Moire (I) is about 39.27 mm. Therefore, because the pattern size (i) of one Moire 80 in the depth (Dt) of about 250 mm is 39.27 mm, the gap of the printed patterns (x5) is about 0.128478 mm.

If the visible distance (D2+D3) is 15 mm, because the parallax (x4) between the lenses at the minimum proximity distance is about 0.1353 mm, compared with the gap of the printed patterns (x5) which is about 0.128478 mm, the size of the three-dimensional pattern as the size (I) of one Moire 80 is about 2.548 mm. Accordingly, the user can sufficiently observe at least one Moire pattern inside the variable view angle recognizing pattern plane 62 with the small area width of about 3 mm or less.

As shown in FIG. 13, the printed layer 60 located at the bottom of the convex lens layer 10 includes the printed pattern plane 61 or/and the variable view angle recognizing pattern plane 62, and is printed or unevenly formed. The pattern printed plane 61 for showing special effects by the convex lenses includes the figure patterns 61-1 to show three-dimensional effects, motions and color changes, and the variable view angle recognizing pattern plane 62 includes the figure patterns 62-1 which causes a change in variable view angle according to the visible distance to make the three-dimensional Moire pattern image 80 varied according to the visible distance. The plane which have no letters or figures may be used according to the design purpose.

As shown in FIG. 13, a letter, 'M', is formed in a small circle at the left top of the sheet. The plane 61 of the letter 'M'' is to show one of three-dimensional effect, motion or color change, and is differentially viewed according to the visible distance by the figure pattern 61-1 of the variable view angle recognizing pattern plane 62 formed in the small circle.

The big letter 'M' formed at the center of the sheet includes a letter and a figure pattern 62-1 forming the variable view angle recognizing pattern plane 62, and is differentially viewed by the figure pattern 61-1 formed on the base surfaces 61 and 62 of the sheet. Alternatively, the figure pattern 62-1 formed on the entire base surface is formed at a parallax density gap different from the figure pattern 62-1 formed on the big letter 'M' so that the user can recognize a differential change according to the visible distance and the sheet can show a more dynamic image.

Particularly, as shown in the enlarged view, fine letters are formed in a circle located at the top of the right side, and the words written in two lines with thickness of 0.3 mm are formed in an area of about 3.8 mm so as to show combination of lines in a fine area as described above. Within the width of 0.3 mm, the figure pattern 62-1 forming the variable view angle recognizing pattern plane 62 is formed. In fact, when the three-dimensional figure pattern is formed, the Moire pattern image 80 cannot be recognized with the naked eyes. However, when the stereoscopic sheet according to the present invention is seen as close as possible to the eyes, as shown in the drawing, the Moire image 80 of the combination of the figure patterns 62-1 having the big letter 'M' can be recognized with the naked eyes.

It is almost impossible to see at least one Moire image in the vision area of 0.3 mm, but the present invention can see through the distance over the 'near-sighted' distance due to the depth (Dt) of the Moire to recognize the figure pattern 62-1. Because an object is located within the 'near-sighted' distance of the crystalline lens 41, only the Moire image 80 of the figure pattern 62-1 is recognized and images around the visible area are seen to be translucently blurred.

That is, because only the pattern 62-1, which is printed within the area of about 0.3 mm, of the images formed on the retina 42 is recognized by the brain and the remainder around the printed pattern cannot form an image on the retina, the remainder around the printed pattern is seemed to be blur, so that the user recognizes it translucent.

Therefore, it provides the effect that the brain automatically differentiates and recognizes light like the case that a person makes a needle hole in a black paper and looks into the needle hole, and it is the principle that the person can look more clearly when the opposite side from the needle hole gets more bright. So, in order to see more clearly, the user observes the sheet through backlight in a state where the stereoscopic sheet of the present invention faces light. Additionally, even though the figure lines of the variable view angle recognizing pattern plane 62 are not in close proximity with each other, the figure pattern 62-1 formed in the single line area of at least 0.5 mm can be recognized as at least one Moire image 80 by the proximity vision.

Figure 14:
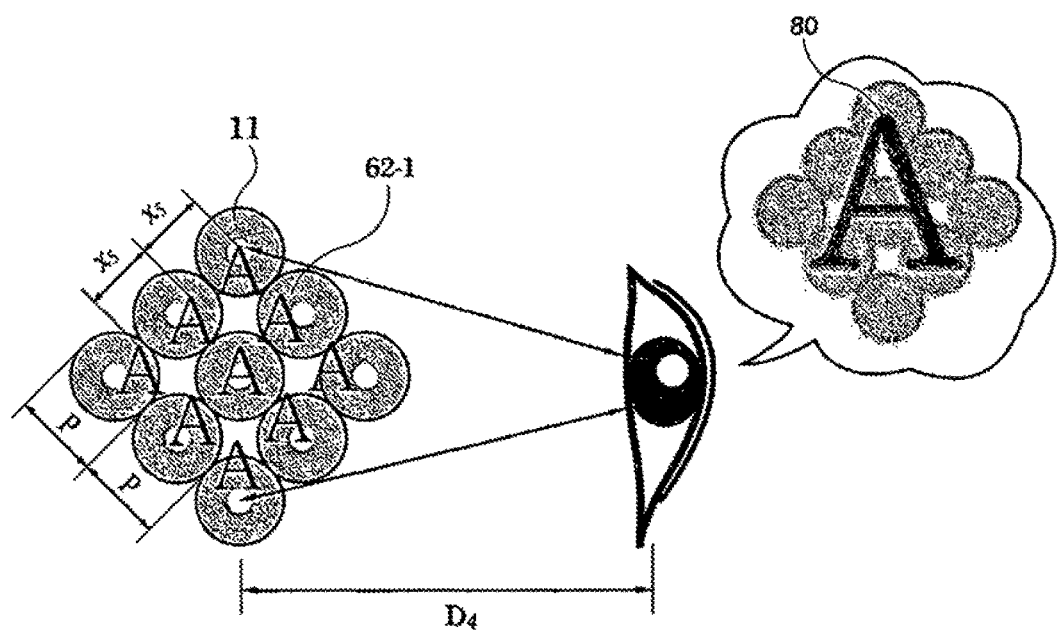
FIG. 14 is an enlarged view showing an array structure of a figure pattern 62-1 and a shape recognized with naked eyes according to the preferred embodiment of the present invention.

FIG. 14 illustrate an array formation of the convex lenses, an array of the figure patterns 62-1 formed on the variable view angle recognizing pattern plane 62 and the image recognized by the naked eyes.

The array of the figure patterns 62-1 is the same as the array angle of the convex lenses 11, and the figure patterns 62-1 are arrayed to perpendicularly intersect to each other at an angle of 45 degrees. The array gap (x5) has a density degree smaller than the array gap (P) of the convex lenses 11, and it has the size to observe at least one Moire image 80 recognized when the variable view angle recognizing pattern plane 62 is viewed, and in this instance, the gap is about 80% to 98% smaller than the parallax gap (x4) to see the center of the convex lenses 11 at the minimum proximity distance.

As shown in the drawing, some parts of the figure patterns 62-1 viewed on the focuses of the convex lenses 11 are enlarged. The enlarged images are seemed to be connected with each other to form one Moire image 80. Of course, because the user can change the intersection array angle and the slope of the convex lenses can be varied by the user at any time, the intersection array angle and the slope of the convex lenses have the same structure and are formed within the density gap of the present invention.

Figure 15:
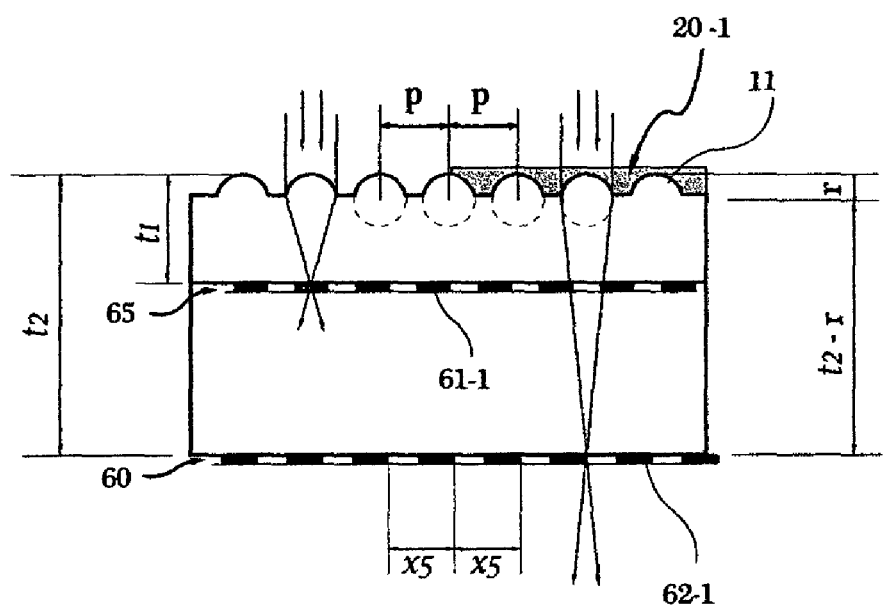
FIG. 15 is a sectional view illustrating a state where water or a liquid material instead of the refractive resin is coated and a printed layer 65 for multiplex vision effects is formed on the top surface of the convex lens.

Referring to FIG. 15, instead of the refractive resin, water or a liquid material is coated on the top surface of the convex lens, and a printed layer 65 to provide multiple vision effects is formed.

A second printed layer 65 is formed between the convex lens layer 10 and the printed layer 60, and the printed image 61 formed on the second printed layer 65 is the figure pattern 61-1 and is printed or unevenly formed at the focal distance (T1) of the convex lens. The pattern printed plane 61 provides various specific effects, such as three-dimensional effects, motions and changes in colors, by the convex lenses, and the printed layer 60 includes figure patterns 62-1 to change and show the Moire pattern image 80, which is seen three-dimensionally, according to the visible distance.

Therefore, for more dynamic expression, water or liquid materials are coated on the surfaces of the convex lenses so as to show various changes on the spot. For instance, assuming that the user irregularly coats the liquid material, differentiated effects are shown at the coated part and at the uncoated part. If the Moire pattern image 80 is changed and recognized at the coated part according to the visible distance, the uncoated part shows three-dimensional images or motion images which are relatively differentiated, so that the user can show new expressions on the spot by coating and wiping the convex lenses whenever the user wants.

As described above, while the present invention has been particularly shown and described with reference to the preferable embodiments thereof, it will be understood by those of ordinary skill in the art that the protective scope of the present invention is not limited to the above embodiments and various changes may be made therein without departing from the technical idea of the present invention.

The invention claimed is:

1. A stereoscopic sheet comprising:
   a convex lens layer comprising convex lenses arrayed on a top surface of the stereoscopic sheet to intersect at regular intervals;
   a printed layer formed at a focal distance of the convex lenses forming a thickness layer of the stereoscopic sheet;
   wherein the focal distance of the convex lenses is formed to be at least 3.5 times longer than a lens pitch, a repetition gap of printed patterns formed on a portion of a printing area of the printed layer is determined as a pattern gap so that a depth and a projection over a near-sighted distance is recognizable by a user, and the repetition gap of the printed pattern is 80% to 98% less than a parallax gap at a minimum proximity distance within the near-sighted distance; and
   wherein visible distances to measure a vision parallax to make the depth and the projection recognized three-dimensionally when viewed at a distance over the near-sighted distance recognizable by the user are approximately 7.2 mm from a surface of the user's eye to a vision intersection point inside the user's eye, a distance from the surface of the user's eye to a center of the convex lens and a distance from the center of the convex lens to the printed layer; and wherein a density gap of the printed patterns is controllable to obtain a measurement value of a visible distance.

2. The stereoscopic sheet according to claim 1, wherein the near-sighted distance is 10 cm to 25 cm.

3. The stereoscopic sheet according to claim 1, wherein a refractive resin which is lower in a refractive index than the convex lenses is coated or hardened on top surfaces of the convex lenses, so that the refractive index is at least 1.35 and the focal distance is extended to be 3.5 times longer than the pitch of the convex lens.

4. The stereoscopic sheet according to claim 1, wherein water or a liquid material is coated on top surfaces of the convex lenses, so that a refractive index is at least 1.3 and the focal distance is extended to be 3.5 times longer than the pitch of the convex lens.

5. The stereoscopic sheet according to claim 1, wherein the convex lenses are arrayed to intersect each other at right angles or at an angle of 60 degrees.

6. The stereoscopic sheet according to claim 1, wherein a pattern printed plane or a printed figure and a variable view angle recognizing pattern plane are formed on the printed layer to be differentially recognized.

7. The stereoscopic sheet according to claim 6, wherein the printed patterns of the pattern printed plane or the variable view angle recognizing pattern plane formed on the printed layer are expressed by printing, embossment or deposition.

8. The stereoscopic sheet according to claim 6, wherein the printed patterns formed on the printed layer are formed to be overlapped doubly.

9. The stereoscopic sheet according to claim 1, wherein a minimum width of lines or figures of a variable view angle recognizing pattern plane formed on the printed layer is 1 mm or less.

10. The stereoscopic sheet according to claim 1, wherein a three-dimensional Moire image can be recognized at a distance over the near-sighted distance and within the near-sighted distance according to a vision parallax that the printed patterns of a variable view angle recognizing pattern plane passes a center of the convex lenses according to visible distances.

11. The stereoscopic sheet according to claim 3, wherein the convex lens layer in a turned over state has a surface of a curvature radius which is located downward, and is adhered or bonded to the thickness layer of the stereoscopic sheet by the refractive resin.

12. The stereoscopic sheet according to claim 1, further comprising a second printed layer formed between the convex lens layer and the printed layer, figure patterns of the printed layer viewed by a refraction difference between the convex lens and water or a liquid material coated on top surface of the convex lens show variable effects according to visible distances, and figure patterns formed on the second printed layer viewed by the convex lenses at a location not coated by the water or the liquid material provide differentiated visible effects.

13. A thin-layered stereoscopic sheet, comprising:
a convex lens layer comprising convex lenses arrayed on a top surface of the stereoscopic sheet to intersect at regular intervals;
a reflection layer formed between the convex lens and a focal distance of the convex lens to form a thickness layer of the stereoscopic sheet from the convex lens to the reflection layer;
a defocus distance printed layer formed at a same distance on an upper part of the convex lens layer from the reflection layer as a gap from the reflection layer to the focal distance;
wherein the focal distance of the convex lenses is formed to be at least 3.5 times longer than a lens pitch, a repetition gap of printed patterns formed on a portion of a printing area of the defocus distance printed layer is determined as a pattern gap so that a depth and a projection of 25 cm or less over a near-sighted distance is recognizable by a user, and the repetition gap of the printed pattern is 80% to 98% less than a parallax gap at a minimum proximity distance within the near-sighted distance; and
wherein visible distances to measure a vision parallax to make the depth and the projection recognized three-dimensionally when viewed at a distance over the near-sighted distance recognizable by the user are approximately 7.2 mm from a surface of the user's eye to a vision intersection point inside the user's eye, a distance from the surface of the user's eye to a center of the convex lens and a distance from the center of the convex lens to the defocused distance printed layer; and
wherein a density gap of the printed patterns is controllable to obtain a measurement value of a visible distance.

14. The thin-layered stereoscopic sheet according to claim 13, further comprising a protective layer formed on the upper part of the convex lens layer; and wherein the defocus distance printed layer is formed on a bottom surface of the protective layer.

15. The thin-layered stereoscopic sheet according to claim 13, further comprising a protective layer formed on the upper part of the convex lens layer; wherein the defocus distance printed layer is formed on the top surface of the protective layer and printing is formed on a bottom surface of the protective layer.

16. The thin-layered stereoscopic sheet according to claim 13, wherein the convex lens layer in a turned over state has a surface of the curvature radius which is located downward, and is adhered or bonded to the thickness layer of the sheet by the refractive resin; and wherein the defocus distance printed layer is formed on the top surface of the turned convex lens layer.

17. A thin-layered stereoscopic sheet in which convex lenses are arrayed at regular intervals to intersect with each other, comprising:
a convex lens layer with a surface of curvature radius facing downward;
a refractive resin coated on the surface of the convex lens layer and formed on a bottom surface of the convex lens to form a plane;
a reflection layer formed on a surface of the refractive resin which forms the plane;
a transparent layer formed on an upper part of the convex lens to form a focal distance thickness to reflect an incident light to the reflection layer;
a defocus distance printed layer formed on a surface of the transparent layer; and
wherein visible distances to measure a vision parallax to make the depth and the projection recognized three-dimensionally when viewed at a distance over the near-sighted distance recognizable by the user are approximately 7.2 mm from a surface of the user's eye to a vision intersection point inside the user's eye, a distance from the surface of the user's eye to a center of the convex lens and a distance from the center of the convex lens to the defocus distance printed layer; and
wherein a density gap of printed patterns formed on a portion of a printing area of the defocus distance printed layer is controllable to obtain a measurement value of a visible distance.

* * * * *